US011076450B2

(12) United States Patent
Chang et al.

(10) Patent No.: US 11,076,450 B2
(45) Date of Patent: Jul. 27, 2021

(54) METHOD AND ASSOCIATED USER EQUIPMENT FOR IMPROVING VERSATILITY OF CELLULAR NETWORK

(71) Applicant: MEDIATEK Inc., Hsin-Chu (TW)

(72) Inventors: Sheng-Kai Chang, Hsin-Chu (TW); Po-Yu Liang, Hsin-Chu (TW); Jen-Chih Chang, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 10 days.

(21) Appl. No.: 16/435,737

(22) Filed: Jun. 10, 2019

(65) Prior Publication Data

US 2020/0252793 A1 Aug. 6, 2020

Related U.S. Application Data

(60) Provisional application No. 62/799,783, filed on Feb. 1, 2019.

(51) Int. Cl.
| | |
|---|---|
| *H04W 88/16* | (2009.01) |
| *H04L 29/06* | (2006.01) |
| *H04W 12/08* | (2021.01) |
| *H04W 4/06* | (2009.01) |
| *H04W 12/033* | (2021.01) |
| *H04W 12/40* | (2021.01) |

(52) U.S. Cl.
CPC ............ *H04W 88/16* (2013.01); *H04W 4/06* (2013.01); *H04W 12/033* (2021.01); *H04W 12/08* (2013.01); *H04W 12/40* (2021.01)

(58) Field of Classification Search
CPC ........... H04W 12/0013; H04W 12/004; H04W 12/08; H04W 4/06; H04W 88/16; H04W 12/00403; H04W 12/033; H04W 12/40; H04W 12/43; H04W 88/06; H04L 65/102; H04L 65/1016; H04L 65/1073; H04L 65/1066; H04L 65/1069
USPC ........................................................ 455/411
See application file for complete search history.

(56) References Cited

U.S. PATENT DOCUMENTS

| | | | |
|---|---|---|---|
| 2007/0156909 A1* | 7/2007 | Osborn ............... | H04L 65/1006 709/227 |
| 2013/0114432 A1* | 5/2013 | Haynes ................ | H04L 63/029 370/252 |
| 2016/0174191 A1* | 6/2016 | Singh .................. | H04W 60/005 370/329 |
| 2017/0118255 A1* | 4/2017 | Tsai .................. | H04W 12/0013 |
| 2017/0171187 A1* | 6/2017 | Yin ...................... | H04L 63/083 |
| 2018/0092142 A1* | 3/2018 | Han ...................... | H04W 16/14 |
| 2019/0098487 A1* | 3/2019 | Boettger ............... | H04W 76/12 |
| 2019/0306898 A1* | 10/2019 | Goddeti ................ | H04W 76/10 |
| 2020/0137679 A1* | 4/2020 | Poovappa ............. | H04W 76/10 |

* cited by examiner

*Primary Examiner* — Farid Seyedvosoghi
(74) *Attorney, Agent, or Firm* — McClure, Qualey & Rodack, LLP

(57) ABSTRACT

The invention provides method and associated user equipment for improving versatility of a cellular network in a network system. The network system may have a packet core which may include a security gateway for facilitating an unlicensed network to interwork with the packet core. The method may include: by a user equipment, accessing a multimedia subsystem via the security gateway over the cellular network, instead of the unlicensed network.

20 Claims, 5 Drawing Sheets

METHOD AND ASSOCIATED USER EQUIPMENT FOR IMPROVING VERSATILITY OF CELLULAR NETWORK

This application claims the benefit of U.S. provisional application Ser. No. 62/799,783, filed Feb. 1, 2019, the subject matter of which is incorporated herein by reference.

FIELD OF THE INVENTION

The present invention relates to method and associated user equipment for improving versatility of cellular network, and more particularly, to method and associated user equipment which may access IMS and/or MMS over the cellular network (e.g., 5G NR network) via a security gateway (e.g., ePDG), so as to support multimedia phone calls and/or messages.

BACKGROUND OF THE INVENTION

Cellular network is essential for modern society. Recently, cellular network based on fifth generation new radio (5G NR) specified by third generation partnership project (3GPP) has started to be deployed. However, conventional (currently existed) 5G specification just focuses on high-speed mobile data transfer between a user equipment (UE) and a public network (e.g., Internet) over 5G cellular network, and lacks solutions to handle voice phone calls and multimedia messages over the 5G cellular network. For a conventional 5G-compatible (5G-ready) UE to make or answer a voice call, the UE needs to downgrade to legacy fourth generation (4G) radio access technology (RAT) and utilize voice over long-term evolution (VoLTE) even when 5G cellular network is available, and therefore interrupts concurrent data transfer (e.g., background data transfer happened during the call) which also downgrades from faster 5G RAT to slower 4G RAT.

Please refer to FIG. 1a illustrating operations of VoLTE in a network system 100. The network system 100 has a packet core 120, which includes a serving gateway (S-GW) 122, a packet data network gateway (P-GW) 124 and an evolved packet data gateway (ePDG) 126. When user of a 5G-compatible UE 110 makes or answers a phone call by VoLTE, the UE 110 needs to access an Internet protocol multimedia subsystem (IMS) 128, which controls and manages phone calls, via the P-GW 124 over a 4G cellular network 130, even if an available 5G cellular network (not shown) coexists along with the 4G cellular network 130. As shown in FIG. 1a, the UE 110 forms a traffic 102a (e.g., stream of data packets) via the 4G cellular network 130, the S-GW 122 and the P-GW 124 to access the IMS 128.

Similarly, when user of the UE 110 sends or receives a multimedia message, the UE 110 needs to access a subsystem 129, which provides multimedia message service (MMS), via the P-GW 124 over the 4G cellular network 130, even if an available 5G cellular network coexists along with the 4G cellular network 130. As shown in FIG. 1a, the UE 110 forms a traffic 104a via the 4G cellular network 130, the S-GW 122 and the P-GW 124 to access the MMS subsystem 129.

During the VoLTE phone call or multimedia message implemented over the 4G cellular network 130, a concurrent mobile data transfer between the UE 110 and a public network (e.g., Internet) 150 can only happened over the 4G cellular network 130 even if a 5G cellular network coexists, as depicted by a traffic 106a which is formed via the 4G cellular network 130, the S-GW 122 and the P-GW 124. In other words, even though conventional 5G RAT allows a mobile data transfer between the UE 110 and the public network 150 to happen over a 5G cellular network, the mobile data transfer will be downgraded to use the 4G cellular network 130 whenever the UE 110 makes/answers a VoLTE phone call or sends/receives a multimedia message.

On the other hand, the UE 110 may adopt another calling solution implemented over a Wi-Fi network 140, as shown in FIG. 1b which illustrates such Wi-Fi calling solution. The Wi-Fi network 140 includes a Wi-Fi access point (AP) 142, such that the UE 110 may access the public network 150 by a traffic 106b formed via the AP 142. When user of the UE 110 makes or answers a phone call by Wi-Fi calling, the UE 110 accesses the IMS 128 via the ePDG 126 over the Wi-Fi network 140 by a traffic 102b formed via the AP 142, the public network 150 and the ePDG 126. Similarly, when user of the UE 110 sends or receives a multimedia message, the UE 110 accesses the MMS subsystem 129 via the ePDG 126 over the Wi-Fi network 140 by a traffic 104b formed via the AP 142, the public network 150 and the ePDG 126.

However, the Wi-Fi calling solution also has disadvantages, e.g., geographic coverage of Wi-Fi network is much narrower than cellular network, and therefore limits mobility of Wi-Fi calling. In addition, some Wi-Fi calling solutions are provide by third-party companies other than operator of cellular network; in order to utilize a W-Fi calling solution of a third-party company to make a phone call, all participants of the call need to be registered members of the third-party company, and will be identified by usernames registered to the third-party company, instead of their phone numbers.

SUMMARY OF THE INVENTION

Therefore, an objective of the invention is providing a method for improving versatility of a cellular network (e.g., 230 in FIG. 2) in a network system (e.g., 200). The network system may have a packet core (e.g., 220) which may include a security gateway (e.g., 226) for facilitating an unlicensed network (e.g., 240) to interwork with the packet core. The method may include: by a user equipment (UE, e.g., 210), accessing a multimedia subsystem (e.g., 228 or 229) via the security gateway over the cellular network, instead of the unlicensed network.

In an embodiment, the multimedia subsystem (e.g., 228) may be an Internet protocol multimedia subsystem (IMS). In an embodiment, the multimedia subsystem (e.g., 229) may be a subsystem providing and supporting multimedia message service (MMS).

In an embodiment, the packet core may further include a serving gateway (e.g., 222) and a packet data network gateway (e.g., 224); the serving gateway may interface between the cellular network and the packet data network gateway, and the packet data network gateway may interface between the serving gateway and a publicnetwork (e.g., 250). And, accessing the multimedia subsystem via the security gateway over the cellular network may be performed by: accessing the multimedia subsystem via the serving gateway, the packet data network gateway, the public network and the security gateway.

In an embodiment (e.g., FIG. 4), accessing the multimedia subsystem via the security gateway over the cellular network may be performed during an advanced mode (e.g., 406), and the method may further include: during a normal mode (e.g., 408), accessing the multimedia subsystem over a second cellular network (e.g., 530 in FIG. 5) without routing via the security gateway, wherein the second cellular network and the cellular network are of different radio access technologies.

In an embodiment, accessing the multimedia subsystem via the security gateway over the cellular network may include: forming a traffic (e.g., 202 or 204 in FIG. 2) over the cellular network based on a subscriber identity module (SIM, e.g., 1 or 2 in FIG. 3), routing the traffic to the security gateway when forming the traffic; and, by the traffic, registering with the multimedia subsystem based on the SIM.

In an embodiment, accessing the multimedia subsystem via the security gateway over the cellular network may include: forming a traffic (e.g., 202 or 204) over the cellular network based on a first SIM (e.g., 1 in FIG. 3); routing the traffic to the security gateway when forming the traffic: and, by the traffic, registering with the multimedia subsystem based on a second SIM (e.g., 2 in FIG. 3) different from the first SIM.

In an embodiment, the cellular network may be a fifth generation new radio (5G NR) network specified by third generation partnership project (3GPP). In an embodiment, the unlicensed network may be a non-3GPP network or a Wi-Fi network. In an embodiment, the security gateway may be an evolved packet data gateway (ePDG) specified by 3GPP.

In an embodiment, the method may further include: by accessing the multimedia subsystem via the security gateway over the cellular network, performing at least one of following: making a voice call, answering a voice call, making a video call, answering a video call, sending a multimedia message, and receiving a multimedia message.

An objective of the invention is providing a UE (e.g., 210 in FIGS. 2 and 3) for improving versatility of a cellular network (e.g., 230 in FIG. 2) in a network system (e.g., 200). The network system may have a packet core (e.g., 220), which may comprise a security gateway (e.g., 226) for facilitating an unlicensed network (e.g., 240) to interwork with the packet core. The UE may include: a network circuit (e.g., 310 in FIG. 3) for forming a traffic (e.g., 202 or 204 in FIG. 2) over the cellular network, and a processor (e.g., 300) coupled to the network circuit, and controlling the network circuit to route the traffic to the security gateway.

In an embodiment, the processor may further controls the network circuit to access a multimedia subsystem (e.g., 228 or 229 in FIG. 2) by the traffic. In an embodiment, the multimedia subsystem may be a subsystem for controlling and managing phone calls between different UEs. In an embodiment, the multimedia subsystem may be a subsystem for controlling and managing multimedia messages between different UEs.

In an embodiment, the packet core may further include a serving gateway (e.g., 222 in FIG. 2) and a packet data network gateway (e.g., 224); the serving gateway may interface between the cellular network and the packet data network gateway, and the packet data network gateway may interface between the serving gateway and a public network (e.g., 250); when the processor controls the network circuit to route the traffic to the security gateway, the processor may control the network circuit to route the traffic to the security gateway via the serving gateway, the packet data network gateway and the public network. In an embodiment, the public network may be Internet.

In an embodiment, the cellular network may be a 5G NR network. In an embodiment, the traffic over the cellular network may be a traffic for at least one of the following: voice call, video call and multimedia message. In an embodiment, the unlicensed network may be a non-3GPP network or a Wi-Fi network.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1A:
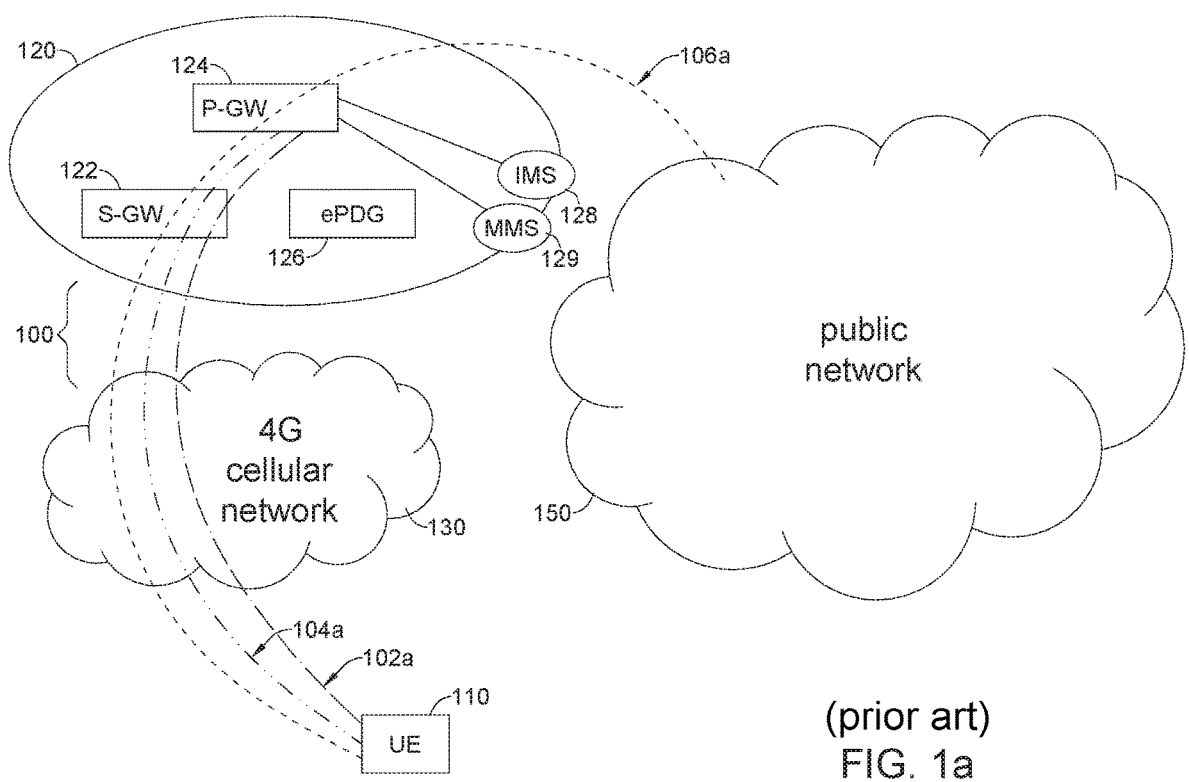
FIG. 1a (prior art) illustrates a conventional VoLTE calling over 4G cellular network.
Figure 1B:
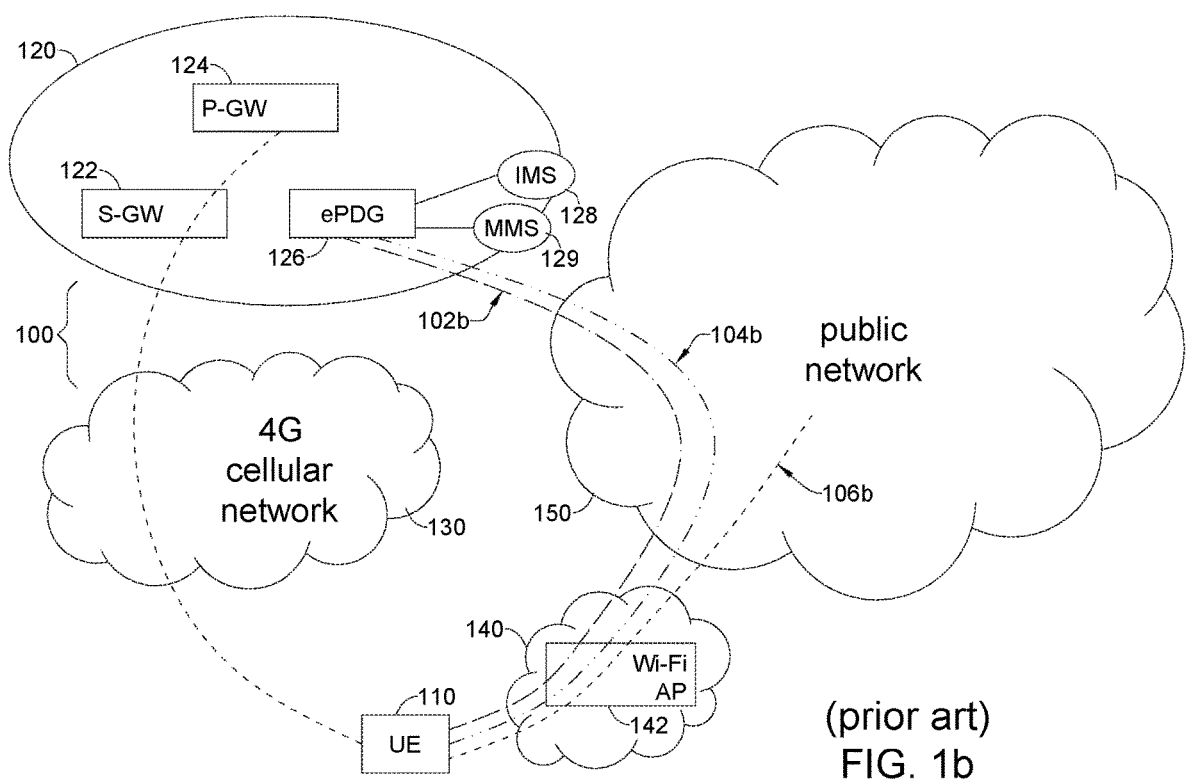
FIG. 1b (prior art) illustrates a conventional Wi-Fi calling over Wi-Fi network.
Figure 2:
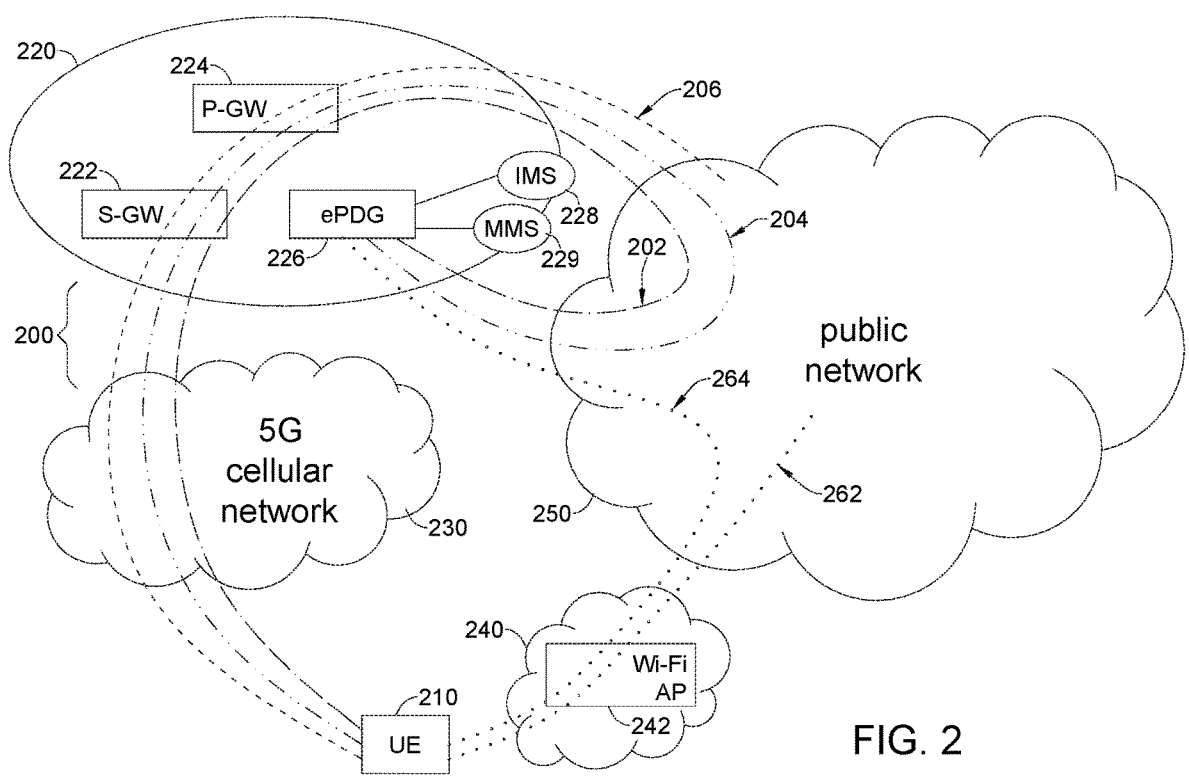
FIG. 2 illustrates, according to an embodiment of the invention, a UE-based calling/messaging solution over a cellular network (e.g., 5G NR) more advanced than 4G cellular network.

Please refer to FIG. 2 illustrating a UE-based calling and/or messaging solution according to an embodiment of the invention. By applying the invention, a UE 210 according to the invention in a network system 200 may make/answer multimedia (voice or video) phone calls and/or send/receive multimedia messages over a cellular network 230 which may be more advanced than 4G cellular network; for example, the cellular network 230 may be a 5G NR cellular network. Hence, unlike prior art calling solution which needs to downgrade to 4G RAT to adopt VoLTE (FIG. 1a) even when 5G cellular network is available, the calling/messaging solution shown in FIG. 2 according to the invention may, without downgrading to 4G RAT, directly utilize the 5G cellular network as bearer to transfer multimedia (e.g., voice or video) data packets of calling/messaging, and may therefore implement multimedia calling/messaging over 5G NR. For convenience of discussion, it is assumed that the cellular network 230 is a 5G NR cellular network throughout the following disclosure. However, it is for illustration only, but not limitation. The cellular network 230 can be any kind of cellular network.

As shown in FIG. 2, the network system 200 may have a packet core 220. The packet core 220 may include a serving gateway (S-GW) 222, a packet data network gateway (P-GW) 224, and a security gateway 226. The S-GW 222 may interface between the cellular network 230 and the P-GW 224, the P-GW 224 may interface between the S-GW 222 and a public network 250, and the security gateway 226 may interface between the packet core 220 and a public network 250, and may therefore facilitate an unlicensed network 240 to interwork with the packet core 220. The packet core 220 may be associated with one or more multimedia subsystems, such as multimedia subsystems 228 and 229 in the example shown in FIG. 2. For example, the multimedia subsystem 228 may be a subsystem for controlling and managing multimedia (voice/audio or video) phone calls between different UEs, such as an IMS. The multimedia subsystem 229 may be a subsystem for controlling and managing multimedia (text, image, audio and/or video) messages between different UEs, such as a subsystem providing and supporting MMS. Each of the subsystems 228 and 229 may be accessed via the P-GW 224 and the security gateway 226.

The cellular network 230 may a 3GPP network; e.g., may be a mobile telecommunication network following 3GPP specifications and being granted by government to utilize licensed radio spectrum(s) such as 5G radio spectrum(s). The cellular network 230 may include a plurality of base stations (not shown) which may communicate with the UE 210 by radio waves of the licensed spectrum(s), and may also be coupled to the S-GW 222. On the other hand, the public network 250 and the unlicensed network 240 may be non-3GPP networks; e.g., they may not be specified by 3GPP; instead, they be specified by specifications beyond scopes of 3GPP specifications. The public network 250 may be Internet, and may include a plurality of network nodes (not shown) such as router(s), server(s) and terminal(s). The unlicensed network 240 may be a wireless network utilizing unlicensed wireless spectrum(s); for example, the unlicensed network 240 may be a Wi-Fi network or a Bluetooth network, etc. The unlicensed network 240 may include one or more access points, such as an access point (AP) 242 in FIG. 2; each AP may communicate with the UE 210 by wireless waves of the unlicensed spectrum(s), and may also be coupled to one or more network nodes (not shown) of the public network 250. The cellular network 230 (e.g., the base stations not shown) and the packet core 220 may be owned, established, managed and/or maintained by an operator (not shown) which is licensed by government. In an embodiment, the unlicensed network 240 may be owned, established, managed and/or maintained by owner(s) other than the operator. In an embodiment, the unlicensed network 240 may be owned, established, managed and/or maintained also by the operator.

If necessary, the UE 210 may access the public network 250 over the cellular network 230 for mobile data transfer; for example, the UE 210 may result in a traffic (e.g., logic link or stream of data packets) 206 between the UE 210 and the public network 250 via the cellular network 230, the S-GW 222 and the P-GW 224. On the other hand, if necessary, the UE 210 may also access the public network 250 over the unlicensed network 240; for example, the UE 210 may result in a traffic 262 between the UE 210 and the public network 250 via the AP 242 of the unlicensed network 240.

Furthermore, if necessary, the UE 210 may support Wi-Fi calling to make/answer phone calls (or to send/receive multimedia messages) by accessing the multimedia subsystem 228 (or 229) via the security gateway 226 over the unlicensed network 240. For example, the UE 210 may communicate with the security gateway 226 via (the AP 242 of) the unlicensed network 240 and the public network 250 to negotiate and maintain a secured tunneling (e.g., an Internet protocol security tunneling, IPsec, not shown) mechanism between the UE 210 and the security gateway 226. Then, by the secured tunneling mechanism, the UE 210 may result in a traffic 264 via the AP 242 of the unlicensed network 240, the public network 250 and the security gateway 226, and may therefore access the multimedia subsystem 228 (or 229) via the security gateway 226 by the traffic 264 for phone calling (or messaging).

Different from VoLTE which degrades concurrent mobile data transfer to 4G RAT and Wi-Fi calling which suffers limited coverage and low mobility, the invention may provide a calling/messaging solution over 5G cellular network. As illustrated by a traffic 202 in FIG. 2, when user of the UE 210 makes or answers a multimedia phone call according to the invention, the UE 210 may access the multimedia subsystem 228 for phone calling sequentially via the S-GW 222, the P-GW 224, the public network 250 and the security gateway 226 over the cellular network 230, instead of the unlicensed network 240. For example, the UE 210 may communicate with the security gateway 226 via the cellular network 230, the S-GW 222, the P-GW 224 and the public network 250 to negotiate and maintain a secured tunneling mechanism between the UE 210 and the security gateway 226 via the cellular network 230, the S-GW 222, the P-GW 224 and the public network 250; by the secured tunneling mechanism, the UE 210 may then result in the traffic 202 between the UE 210 and the security gateway 226 by routing via the cellular network 230, the S-GW 222, the P-GW 224 and the public network 250, and may then access the multimedia subsystem 228 via the security gateway 226 by the traffic 202 for phone calling.

Similarly, as illustrated by a traffic 204 in FIG. 2, when user of the UE 210 sends or receives a multimedia message according to the invention, the UE 210 may access the multimedia subsystem 229 for multimedia messaging via the S-GW 222, the P-GW 224, the public network 250 and the security gateway 226 over the cellular network 230, instead of the unlicensed network 240. For example, the UE 210 may communicate with the security gateway 226 via the cellular network 230, the S-GW 222, the P-GW 224 and the public network 250 to negotiate and maintain a secured tunneling mechanism between the UE 210 and the security gateway 226 via the cellular network 230, the S-GW 222, the P-GW 224 and the public network 250; by the secured tunneling mechanism, the UE 210 may result in the traffic 204 between the UE 210 and the security gateway 226 by routing via the cellular network 230, the S-GW 222, the P-GW 224 and the public network 250, and may then access the multimedia subsystem 229 via the security gateway 226 by the traffic 204 for multimedia messaging.

Similar to a portion of the Wi-Fi calling solution, when implementing the calling/messaging solution according to the invention, the UE 210 may access the subsystem 228 or 229 via the public network 250 and the security gateway 226. For example, by accessing the subsystem 228 or 229 via the public network 250 and the security gateway 226, the UE 210 may emulate an entity (a participant) of Wi-Fi calling. However, in the calling/messaging solution according to the invention, accessing the subsystem 228 or 229 via the public network 250 and the security gateway 226 may happen over the cellular network 230 (as depicted by the traffic 202 or 204), rather than happen over the unlicensed network 240 (as depicted by the traffic 264). Since the invention may be implemented over the cellular network 230 instead of the unlicensed network 240, the invention may effectively avoid limited coverage and low mobility of Wi-Fi calling.

In addition, because the calling/messaging solution according to the invention may be implemented directly over the cellular network 230 of 5G RAT and thus may not need to downgrade to 4G RAT during calling and/or messaging, mobile data transfer between the UE 210 and the public network 250 (e.g., the traffic 206) happened during calling/messaging may also keep using 5G RAT, without being downgraded to 4G RAT. Hence, the invention may avoid disadvantages of VoLTE. By providing calling/messaging solution over 5G cellular network, the invention may also improve versatility of 5G cellular network, because conventional 5G specification lacks calling/messaging solution directly implemented over 5G cellular network.

The calling/messaging solution according to the invention may be a UE-based solution; e.g., the invention may be implemented solely by the UE 210, while the associated peripheral infrastructure, including the cellular network 230, the packet core 220, the subsystems 228 and 229 as well as the public network 250 (and the unlicensed network 240), may remain conventional, and may not need to be modified for the invention. The invention may remain compliant to currently existed specifications (e.g., 3GPP specifications) and protocols, and may not need to modify currently existed specifications and protocols. To implement the invention, the UE 210 may follow currently existed protocols and specifications to access the public network 250 over the cellular network 230, with the access additionally routed to the security gateway 226. Moreover, the UE 210 may implement the invention to call or message other UE (or UEs, not shown) which may or may not implement the invention. For example, the UE 210 may make a phone call to a second UE (not shown) over the 5G cellular network 230 according to the invention, while the second UE may answer the phone call by VoLTE over a 4G cellular network (or by more traditional circuit-switch telecommunication technologies) if the second UE does not implement the invention. Similarly, the second UE may make a phone call by VoLTE over a 4G cellular network or by other conventional telecommunication technologies, and the UE 210 may answer the phone call by the invention implemented over the 5G cellular network 230.

According to the invention, the UE 210 may register with the multimedia subsystem 228 or 229 based on currently existed protocols by routing to the security gateway 226 via the public network 250 over the cellular network 230, and then be identified as an entity which may make/answer phone calls or send/receive multimedia messages via the security gateway 226. Once the UE 210 registers with the multimedia subsystem 228 (or 229), the associated operator(s) may follow currently existed phone switch mechanism to handle calls or messages between the UE 210 and any other UE(s) which may or may not implement the invention, and then may be unaware of that the UE 210 may utilize the 5G cellular network 230 as bearer for phone calls or multimedia messages.

Figure 3:
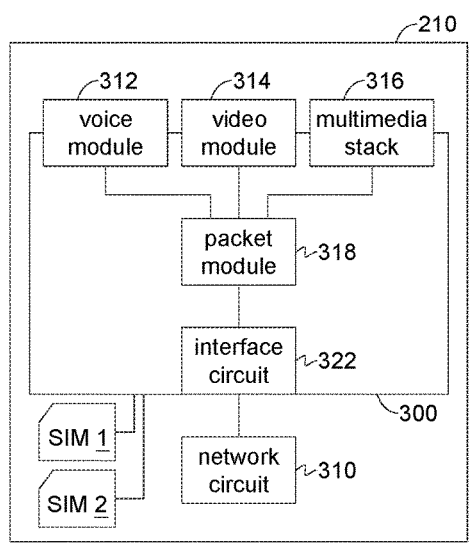
FIG. 3 illustrates a UE according to an embodiment of the invention.

Along with FIG. 2, please refer to FIG. 3 illustrating the UE 210 according to an embodiment of the invention. The UE 210 may be a 5G-compatible (5G-ready) smart phone, tablet computer, notebook computer, wearable gadget or consumer electronic product, etc. The UE 210 may include a network circuit 310 and a processor 300 coupled to the network circuit 310. The UE 210 may also include one or more subscriber identity modules (SIMs). In an embodiment, the UE 210 may include SIM 1 and SIM 2, as shown in FIG. 3; in an embodiment, the UE 210 may only include the SIM 1, without the SIM 2. Each of the SIMs 1 and 2 may be a physical module or a virtual module implemented in a memory (not shown).

In the UE 210, the network circuit 310 may include a modem (modulator-demodulator) compliant to 3GPP specifications, and may communicate with the cellular network 230 by radio waves. To implement the invention, the processor 300 may control the network circuit 310 to form a traffic (e.g., the traffic 202 or 204 in FIG. 2) over the cellular network 230 by 5G RAT, route the traffic of the cellular network 230 to the security gateway 226 via the S-GW 222, the P-GW 224 and the public network 250 when forming the traffic, and then register with and access the multimedia subsystem 228 or 229 by the traffic for voice call, video call or multimedia message. The network circuit 310 may also include circuitry for communicating with the unlicensed network 240 (e.g., the AP 242) by wireless waves.

The processor 300 may include a packet module 318 and an interface circuit 322. When implementing the invention, the processor 300 may collaborate with a voice module 312 and/or a video module 314 to acquire and process (e.g., encode and/or compress) voice and/or video data of multimedia call or message, and the packet module 318 may pack the voice and/or video data to packets (not shown) according to a multimedia stack (e.g., IMS stack and/or MMS stack) 316 and TCP/IP protocol, and may cause the packets to be routed to the security gateway 226 via the public network 250. The interface circuit 322 may send the packets to the network circuit 310, and the network circuit 310 may transmit the packets to the cellular network 230 by radio waves, such as 5G radio waves; then the packets may travel to the security gateway 226 (and then the multimedia subsystem 228 or 229) via the S-GW 222, the P-GW 224 and the public network 250, as shown by the traffic 202 or 204. On the other hand, other packets containing voice and/or video data of multimedia call or message from another UE (not shown) may travel from the security gateway 226 to the UE 210 via the public network 250, the P-GW 224, the S-GW 222 and the cellular network 230, as shown by the traffic 202 or 204; the network circuit 310 may also receive these incoming packets from the cellular network 230 by radio waves, such as 5G radio waves. The interface circuit 322 in the processor 300 may receive the packets from the network circuit 310, the packet module 318 may unpack the packets to retrieve voice and/or video data according to the multimedia stack 316, and the processor 300 may collaborate with the voice module 312 and/or the video module 314 to process (e.g., decode and/or decompress) and play the retrieved voice and/or video data. Each of the voice module 312 and the video module 314 may be implemented by circuitry external to the processor 300, circuitry built in the processor 300, or a combination of both.

Figure 4:
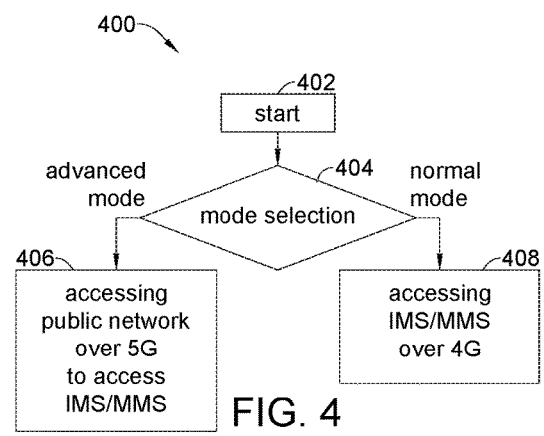
FIG. 4 illustrates a flowchart according to an embodiment of the invention.

In an embodiment, the UE 210 according to the invention may select to utilize the calling/messaging solution of the invention over the 5G cellular network 230, or to utilize the conventional VoLTE calling/messaging solution over 4G cellular network. Along with FIG. 2, please refer to FIG. 4 illustrating a flowchart 400 according to an embodiment of the invention; the UE 210 (FIG. 2) may be configured to execute the flowchart 400 to determine how to handle (make/answer and/or send/receive) multimedia calls and/or messages. The flowchart 400 may start at step 402. At step 404, the UE 210 may check which mode is selected for handling calls and/or messages. If an advanced mode is selected at step 404, the UE 210 may proceed to step 406 to handle multimedia calls and/or messages by the invention; that is, during the advanced mode, the UE 210 may access the public network 250 over the 5G cellular network 230 via the cellular network 230, the S-GW 222 and the P-GW 224, so as to access the multimedia subsystem 228 or 229 via the public network 250 and the security gateway 226 for calling or messaging by 5G RAT, as illustrated by the traffic 202 or 204 in FIG. 2.

Figure 5:
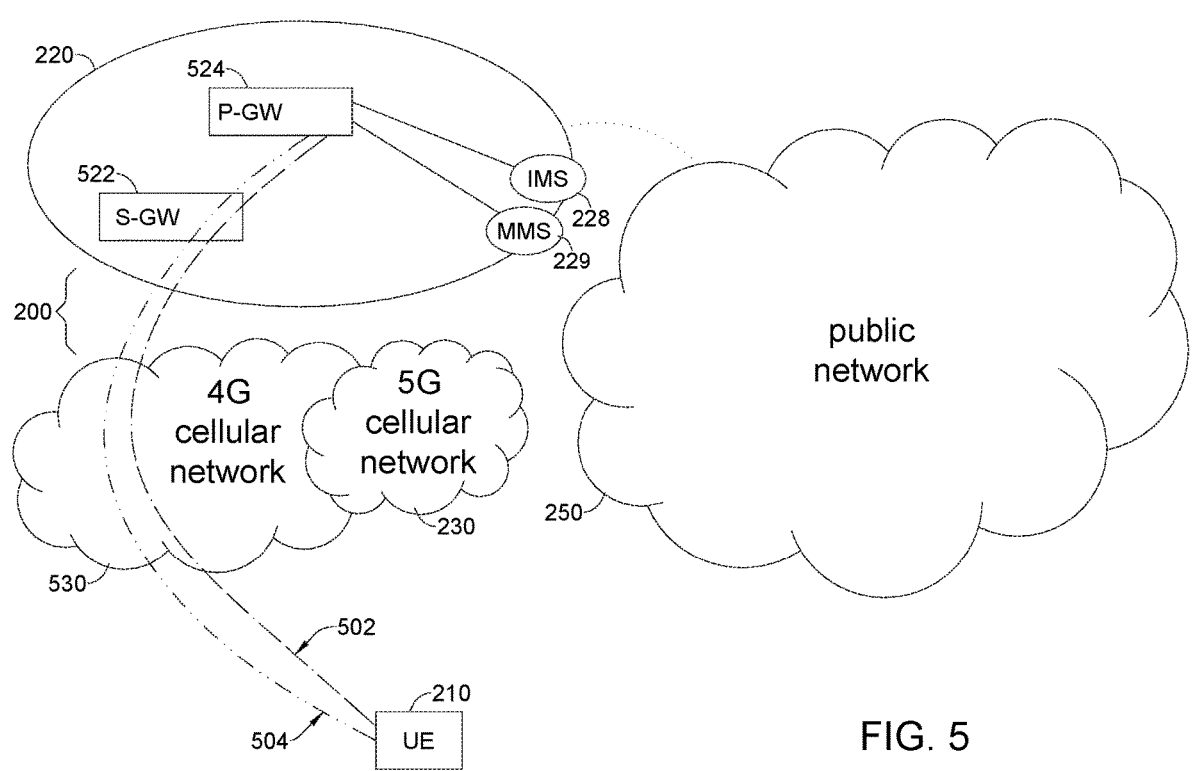
FIG. 5 illustrates operations in a normal mode of the flowchart shown in FIG. 4.

On the other hand, if a normal mode is selected at step 404, the UE 210 may proceed to step 408 to handle multimedia calls and/or messages by 4G RAT. Along with FIG. 2 and FIG. 4, please refer to FIG. 5 illustrating operations during the normal mode according to an embodiment of the invention. As shown in FIG. 5, in the normal mode, by an S-GW 522 and a P-GW 524 in the packet core 220, the UE 210 may access the multimedia subsystem 228 or 229 over a 4G cellular network 530 via the S-GW 522 and the P-GW 524 without routing via the security gateway 226, as depicted by a traffic 502 or 504. In FIG. 5, the S-GW 522 may interface between the 4G cellular network 530 and the P-GW 524, and the P-GW 524 may interface between the S-GW 522 and the public network 250. The S-GW 522 (FIG. 5) for the 4G cellular network 530 may be the same as or different from the S-GW 222 (FIG. 2) for the 5G cellular network 230. The P-GW 524 (FIG. 5) between the S-GW 522 and the public network 250 may be the same as or different from the P-GW 224 (FIG. 2) between the S-GW 222 and the public network 250.

The advanced mode (step 406) according to the invention may be considered as a data priority mode, because the UE 210 in the advanced mode may handle multimedia calls or messages over the 5G cellular network 230, so mobile data transfer between the UE 210 and the public network 250 happened during calling or messaging may keep using the 5G cellular network 230. On the other hand, the normal mode (step 408) may be considered as a backward compatible mode, since the UE 210 in the normal mode may downgrade to 4G RAT to handle multimedia calls or messages over the 4G cellular network 530 by VoLTE.

The mode selection at step 404 may be manually set by user of the UE 210, and/or be automatically set by the UE 210 according to one or more criteria. For example, in an embodiment, the UE 210 may automatically select the advanced mode (step 406) when the 5G cellular network is available, when a signal strength of the 5G cellular network is stronger than a signal strength of the 4G cellular network, or, when the 5G cellular network is available and an important data transfer over the 5G cellular network is still running. In an embodiment, user may set the advanced mode as a default mode; accordingly, the UE 210 may operate in the advanced mode whenever possible, and may automatically switch to, or remind user to manually switch to, the normal mode when the 5G cellular network becomes unavailable. In an embodiment, user may set the advanced mode as a default mode, and may further assign a usage threshold for the 5G cellular network; accordingly, the UE 210 may operate in the advanced mode when the 5G cellular network is available and an amount of data transferred over the 5G cellular network is below the usage threshold, and the UE 210 may automatically switch to, or remind user to manually switch to, the normal mode when the 5G cellular network is unavailable or when the amount of data transferred over the 5G cellular network reaches the usage threshold.

As shown in FIG. 3, the UE 210 may include one or more SIMs, such as the SIM 1 and SIM 2. In an embodiment, the UE 210 may include both the SIM 1 and SIM 2 respectively associated with two different phone numbers. When implementing the invention to access the multimedia subsystems 228 or 229 by the traffic 202 or 204 (FIG. 2), the UE 210 may form the traffic 202 or 204 over the cellular network 230 based on the SIM 1 to access the public network 250, and may register with the multimedia subsystem 228 or 229 by contents of the traffic 202 or 204 based on the SIM 2, For example, the UE 210 may identify itself by the SIM 1 to the operator (not shown) of the cellular network 230, so the operator may allow the UE 210 to access the public network 250 via the cellular network 230, the S-GW 222 and the P-GW 224 under the identification of the SIM 1; on the other hand, the UE 210 may embed information of the SIM 2 in contents of the access to notify the subsystem 228 or 229, so as to register with the multimedia subsystem 228 or 229 under the identification of the SIM 2, and the subsystem 228 or 229 may then recognize the UE 210 as an entity which may make/answer phone calls or send/receive multimedia messages by the phone number associated with the SIM 2.

To implement the invention by accessing the public network 250 over the cellular network 230 based on the SIM 1 and registering with the multimedia subsystem 228 or 229 based the SIM 2 may be beneficial. For example, when user of the UE 210 visits a place other than home and therefore the available cellular network 230 is owned by a local operator of the visited place other than a home operator of the home, the user may install a local SIM of the local operator as the SIM 1, and may keep a home SIM of the home operator as the SIM 2. Thus, when calling or messaging according to the invention, the UE 210 may access the public network 250 over the cellular network 230 by the local SIM 1, and register with and access the multimedia subsystem 228 or 229 by the home SIM 2; in this way, the UE 210 may still be identified by the familiar phone number associated with the home SIM 2 when calling or messaging, but will be charged by a lower local fee for accessing the public network 250, instead of a much higher roaming fee, since the UE 210 may access the public network 250 over the local cellular network 230 by the local SIM 1, instead of the home SIM 2.

In an embodiment, the UE 210 may only include the SIM 1, or may include the SIMs 1 and 2 but may select, e.g., SIM 1 as a default SIM. When implementing the invention to access the multimedia subsystems 228 or 229 by the traffic 202 or 204, the UE 210 may form the traffic 202 or 204 over the cellular network 230 based on the default SIM 1, and may register with the multimedia subsystem 228 or 229 also based on the default SIM 1. For example, the UE 210 may identify itself by the SIM 1 to the operator of the cellular network 230 and the packet core 220, so the operator may allow the UE 210 to access the public network 250 via the cellular network 230, the S-GW 222 and the P-GW 224 under the identification of the SIM 1, Moreover, the UE 210 may embed information of the SIM 1 in contents of the access to notify the multimedia subsystem 228 or 229, so as to register with the multimedia subsystem 228 or 229 also under the identification of the SIM 1, and the subsystem 228 or 229 may then identify the UE 210 as an entity which may make/answer phone calls or send/receive multimedia messages by the phone number associated with the SIM 1.

To sum up, the invention may provide a calling and/or messaging solution over 5G cellular network, and may therefore improve versatility of 5G cellular network, since there is no conventional calling/messaging solution which is actually implemented over 5G cellular network, According to conventional calling/messaging solutions, a conventional 5G-compatible UE must downgrade to 4G RAT to adopt VoLTE over 4G cellular network, or utilize Wi-Fi calling over Wi-Fi network, even when 5G cellular network is available. Comparing to the VoLTE which also downgrades mobile data transfer to 4G RAT and the Wi-Fi calling which suffers from limited geographic coverage and low mobility, the calling/messaging solution according to the invention may be implemented directly over 5G cellular network of broader coverage and high mobility, without downgrading to 4G RAT. Moreover, by accessing the multimedia subsystem over the high-speed 5G cellular network of more advanced 5G RAT, a UE implementing the invention may make/answer voice calls of higher audio quality, send/receive multimedia messages of richer contents (e.g., texts of more available fonts and formats, images and/or videos of higher resolution and wider color range, and/or stickers/emoticons of more details and/or better animation effects, etc.), and/or even make/answer video call of higher resolution and/or wider color range.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for improving versatility of a cellular network in a network system, comprising:
   by a user equipment, forming a bearer of the cellular network;
   over the bearer of the cellular network, routing from a first gateway outward to a public network out of the network system, and then back to a second gateway; and
   accessing a multimedia subsystem via the second gateway over the bearer of the cellular network; wherein:
   the first gateway and the second gateway are both in the network system.

2. The method of claim 1, wherein the multimedia subsystem is an Internet protocol multimedia subsystem (IMS).

3. The method of claim 1, wherein the multimedia subsystem is a subsystem supporting multimedia message service (MMS).

4. The method of claim 1, wherein:
   when routing from the first gateway outward to the public network and then back to the second gateway, routing from a serving gateway and the first gateway outward to the public network and then back to the second gateway;
   the first gateway is a packet data network gateway interfacing between the serving gateway and the public network; and
   the serving gateway and the first gateway are both in the network system.

5. The method of claim 1, wherein accessing the multimedia subsystem via the second gateway over the bearer of the cellular network is performed during an advanced mode, and the method further comprises:
   during a normal mode, accessing the multimedia subsystem over a second bearer of a second cellular network without routing via the second gateway, wherein the second cellular network and the cellular network are of different radio access technologies.

6. The method of claim 1, wherein accessing the multimedia subsystem via the second gateway over the bearer of the cellular network comprises:
   forming a traffic over the bearer based on a subscriber identity module (SIM);
   routing the traffic to the second gateway when forming the traffic; and
   by the traffic, registering with the multimedia subsystem based on the SIM.

7. The method of claim 1, wherein accessing the multimedia subsystem via the second gateway over the bearer of the cellular network comprises:
   forming a traffic over the bearer based on a first SIM;
   routing the traffic to the second gateway when forming the traffic; and
   by the traffic, registering with the multimedia subsystem based on a second SIM different from the first SIM.

8. The method of claim 1, wherein the cellular network is a fifth generation new radio (5G NR) network specified by third generation partnership project (3GPP).

9. The method of claim 1, wherein the second gateway is a security gateway for facilitating an unlicensed network to interwork with a packet core in the network system, and the unlicensed network is a non-3GPP network or a Wi-Fi network.

10. The method of claim 1, wherein the second gateway is an evolved packet data gateway (ePDG) specified by 3GPP.

11. The method of claim 1 further comprising:
    by accessing the multimedia subsystem via the second gateway over the bearer of the cellular network, executing at least one of following:
    making a voice call;
    answering a voice call;
    making a video call;
    answering a video call;
    sending a multimedia message; and
    receiving a multimedia message.

12. A UE for improving versatility of a cellular network in a network system, comprising:
    a network circuit; and
    a processor coupled to the network circuit, and controlling the network circuit to:
    form a bearer of the cellular network;
    over the bearer of the cellular network, route from a first gateway outward to a public network out of the network system, and then back to a second gateway; and
    access a multimedia subsystem via the second gateway over the bearer of the cellular network; wherein:
    the first gateway and the second gateway are both in the network system.

13. The UE of claim 12, wherein the multimedia subsystem is an Internet protocol multimedia subsystem (IMS) or a subsystem supporting multimedia message service (MMS).

14. The UE of claim 12, wherein:
    when the processor controls the network circuit to route from the first gateway outward to the public network and then back to the second gateway, the processor controls the network circuit to route from a serving gateway and the first gateway outward to the public network and then back to the second gateway;
    the first gateway is a packet data network gateway interfacing between the serving gateway and the public network; and
    the serving gateway and the first gateway are both in the network system.

15. The UE of claim 12, wherein the processor controls the network circuit to access the multimedia subsystem via the second gateway over the bearer of the cellular network during an advanced mode, and the processor further controls the network circuit to:
    during a normal mode, access the multimedia subsystem over a second bearer of a second cellular network without routing via the second gateway, wherein the second cellular network and the cellular network are of different radio access technologies.

16. The UE of claim 12, wherein accessing the multimedia subsystem via the second gateway over the bearer of the cellular network comprises:

forming a traffic over the bearer based on a subscriber identity module (SIM);
routing the traffic to the second gateway when forming the traffic; and
by the traffic, registering with the multimedia subsystem based on the SIM.

17. The UE of claim 12, wherein accessing the multimedia subsystem via the second gateway over the bearer of the cellular network comprises:
forming a traffic over the bearer based on a first SIM;
routing the traffic to the second gateway when forming the traffic; and
by the traffic, registering with the multimedia subsystem based on a second SIM different from the first SIM.

18. The UE of claim 12, wherein the cellular network is a fifth generation new radio (5G NR) network specified by third generation partnership project (3GPP).

19. The UE of claim 12, wherein the second gateway is an evolved packet data gateway (ePDG) specified by 3GPP or a security gateway for facilitating an unlicensed network to interwork with a packet core in the network system, and the unlicensed network is a non-3GPP network or a Wi-Fi network.

20. The UE of claim 12, wherein:
by accessing the multimedia subsystem via the second gateway over the bearer of the cellular network, the processor further executes at least one of following:
making a voice call;
answering a voice call;
making a video call;
answering a video call;
sending a multimedia message; and
receiving a multimedia message.

* * * * *